Dec. 16, 1924.
M. L. PETERMAN
BEARING LUBRICATING DEVICE
Filed Feb. 23, 1923
1,519,699
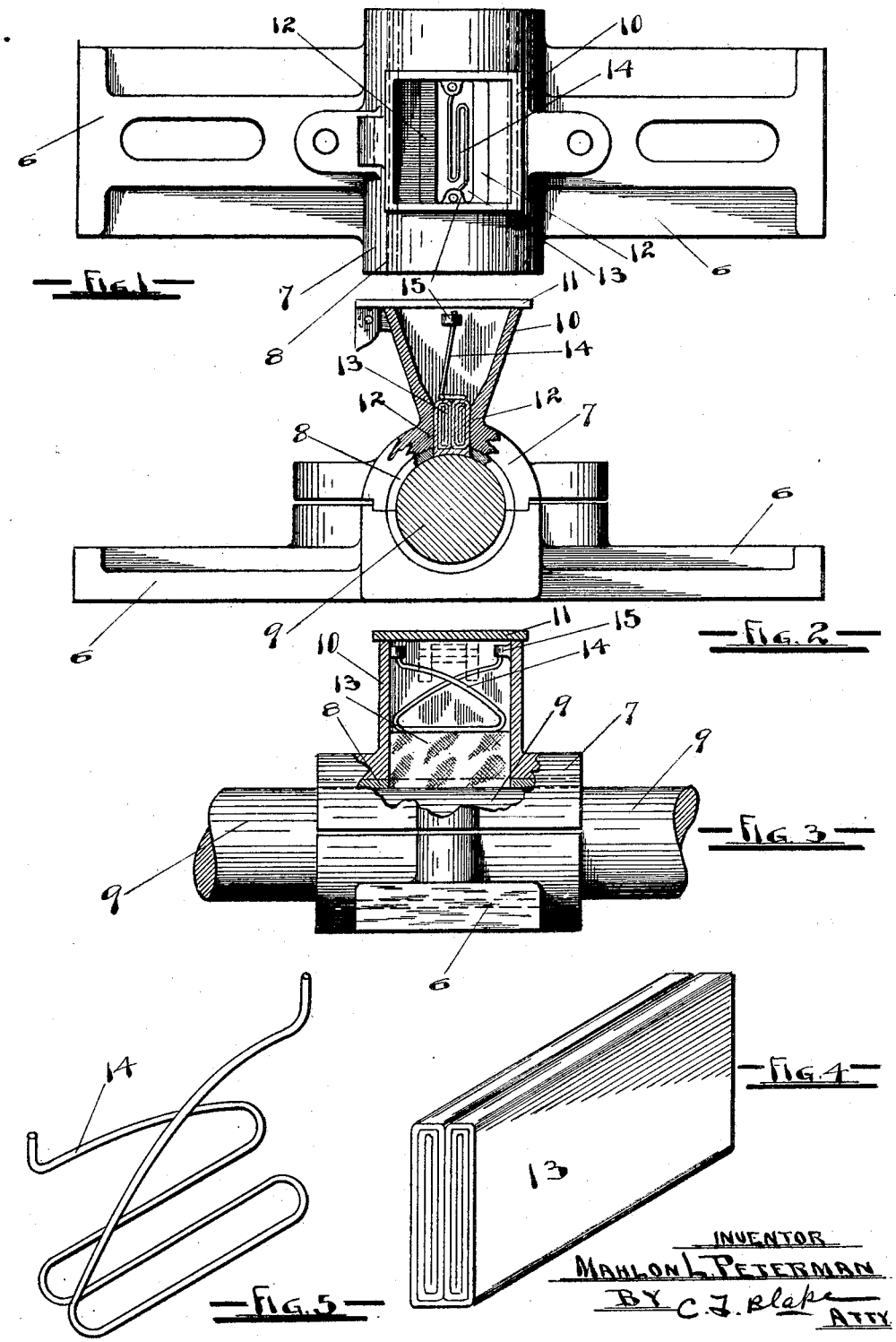

Patented Dec. 16, 1924.

1,519,699

UNITED STATES PATENT OFFICE.

MAHLON L. PETERMAN, OF PORTLAND, OREGON.

BEARING-LUBRICATING DEVICE.

Application filed February 23, 1923. Serial No. 620,644.

*To all whom it may concern:*

Be it known that I, MAHLON L. PETERMAN, a citizen of the United States, residing at Portland, county of Multnomah, State of Oregon, have invented certain new and useful Improvements in Bearing-Lubricating Devices, of which the following is a specification.

My invention relates to bearings in general, and particularly to shaft bearings of the pillow block and hanger types, the object being to provide efficient oil lubricating means in such a bearing, I accomplish this object by means of the construction illustrated in the accompanying drawing, which is a part of this application for Letters Patent, like characters of reference indicating like parts throughout the several views thereof, and in which:

Fig. 1 is a plan view of a bearing embodying my invention.

Fig. 2 is a side elevation of the same, parts broken away.

Fig. 3 is an end elevation, parts being broken away.

Fig. 4 is a perspective view of the oil pad.

Fig. 5 is a perspective view of the pad spring.

In general my device consists of a box bearing having an oil reservoir thereon containing lugs to form a parallel sided orifice connecting said reservoir with the shaft bearing, a folded oil pad within said orifice, and a spring to hold said pad in place.

The bearing box is composed of the usual base 6 and cap 7 with a bearing sleeve or bushing 8 to receive the shaft 9.

Integral with the cap 7 is an oil reservoir 10 having a hinged cover 11. The end walls of the reservoir are parallel as shown in Fig. 3, but the side walls are inclined as shown in Fig. 2, and at the bottom of said inclined walls lugs 12 are provided to form a parallel sided orifice communicating with the shaft bushing and shaft, as shown in Fig. 2.

Within said orifice is disposed an oil pad of folded woven material, preferably burlap, of such material being folded upon a strip of such material several times at each end to form the pad, as shown in Fig. 4. This forms a substantially rectangular pad, and due to the parallel sides of the said orifice, said pad may be driven solidly into said orifice, the construction of said orifice and said pad enabling the latter to be driven solidly into the former being an important feature of my invention.

To prevent the vibration of the bearing from loosening said pad within the orifice I provide a spring bearing upon the upper surface of said pad, and engaging lugs 15 within the reservoir.

I have discovered that by driving a woven fabric folded into a pad into an orifice between the reservoir and the shaft of such a bearing great economy of oil is obtained. The compressed pad will not permit oil to flow when the shaft is idle, and when the shaft is running will permit oil to flow only as fast as needed for lubrication, the oil soaked compressed pad becoming a gumplike lubricating agent, and also a filter to prevent dirt that may be present within the reservoir from entering the shaft bearing.

My device may be made of any size, and constructed of any materials deemed convenient and suitable for a device of this character, and while I have illustrated and described a form of construction found desirable in materializing my invention, I wish to include in this application all mechanical equivalents and substitutes that may fairly be considered to come within the scope and purview of my invention as defined in the appended claim.

Having disclosed my invention so that others may be enabled to construct and to use the same what I claim as new and desire to secure by Letters Patent is:

In a bearing: a cap; a shaft seat within said cap; a reservoir upon said cap; lugs within said reservoir forming therebetween a parallel sided orifice communicating with said reservoir and with said shaft seat; a folded pad of woven material adapted to be driven into said orifice; and a spring adapted to press upon said pad.

In witness whereof I claim the foregoing as my own I hereunto affix my signature in the presence of two witnesses at Portland, county of Multnomah, State of Oregon, this 8th day of Feb. 1923.

MAHLON L. PETERMAN.

Witnesses:
L. J. ROBINSON,
C. F. BLAKE.